United States Patent
Barandun

[19]

[11] Patent Number: 5,820,323

[45] Date of Patent: Oct. 13, 1998

[54] WELD-ON FASTENER, WELDING EQUIPMENT FOR THE WELDING OF THE FASTENER, AND ARRANGEMENT FOR THE FASTENING OF AN ASSEMBLY PART TO THE WELDABLE FASTENER

[75] Inventor: Heinz Peter Barandun, Zurich, Switzerland

[73] Assignee: Splitfast Technologies Limited, Dublin, Ireland

[21] Appl. No.: 379,446

[22] PCT Filed: Jul. 27, 1993

[86] PCT No.: PCT/EP93/01922

§ 371 Date: Jun. 30, 1995

§ 102(e) Date: Jun. 30, 1995

[87] PCT Pub. No.: WO94/03735

PCT Pub. Date: Feb. 17, 1994

[30] Foreign Application Priority Data

| Jul. 30, 1992 | [DE] | Germany | 42 25 199.0 |
| Jul. 30, 1992 | [DE] | Germany | 42 25 215.6 |
| Jul. 30, 1992 | [DE] | Germany | 42 25 216.4 |
| Jan. 5, 1993 | [DE] | Germany | 43 00 120.3 |
| Jan. 5, 1993 | [DE] | Germany | 43 00 121.1 |

[51] Int. Cl.⁶ .......................... F16B 37/06; F16B 37/08; F16B 37/16; F16B 19/00

[52] U.S. Cl. .................. 411/171; 411/433; 411/437; 411/513; 411/516; 411/509

[58] Field of Search .................................. 411/171, 324, 411/427, 433, 437, 479, 513, 514, 516, 520, 508, 509, 525–527

[56] References Cited

U.S. PATENT DOCUMENTS

| 1,354,549 | 10/1920 | Gilmer . | |
| 1,850,713 | 3/1932 | Fox | 411/516 X |
| 2,240,425 | 4/1941 | Sternbergh | 411/433 |
| 2,582,580 | 1/1952 | Bedford, Jr. | 411/520 |
| 2,737,843 | 3/1956 | Koehl | 411/479 |
| 2,972,275 | 2/1961 | Baubles | 411/479 |
| 3,027,609 | 4/1962 | Parkin et al. | 411/526 X |
| 3,217,584 | 11/1965 | Amesbury | 411/508 |
| 3,352,191 | 11/1967 | Crawford . | |
| 3,680,272 | 8/1972 | Meyer | 411/508 X |
| 3,996,446 | 12/1976 | Tauern et al. . | |
| 4,806,064 | 2/1989 | Breese | 411/479 |
| 4,922,587 | 5/1990 | Pettit . | |

FOREIGN PATENT DOCUMENTS

| 870008 | 12/1978 | Belgium . | |
| 887911 | 12/1971 | Canada . | |
| 0406459 | 1/1991 | European Pat. Off. . | |
| 623064 | 12/1935 | Germany . | |
| 832086 | 2/1952 | Germany . | |
| 848123 | 9/1952 | Germany | 411/513 |
| 1817135 | 7/1970 | Germany . | |
| 2227384 | 2/1973 | Germany . | |
| 2532311 | 2/1977 | Germany . | |
| 7925469 | 12/1979 | Germany . | |
| 3218886 | 11/1983 | Germany . | |
| 227212 | 5/1943 | Switzerland . | |
| 1275799 | 5/1972 | United Kingdom . | |

*Primary Examiner*—Neill R. Wilson
*Attorney, Agent, or Firm*—Foley & Lardner

[57] ABSTRACT

The present invention refers to a fastener which is welded by arc welding by one end face to a component and which is in the form of a radially resilient sleeve with a longitudinal slit and designed to permit resilient compression of the fastener, to a welding assembly apparatus for welding on elongate fateners, with a feed channel and an axially displaceable holder for the fasteners, and to an arrangement for securing an assembly part on a fastener which has been welded by arc welding on to a component.

76 Claims, 10 Drawing Sheets

WELD-ON FASTENER, WELDING EQUIPMENT FOR THE WELDING OF THE FASTENER, AND ARRANGEMENT FOR THE FASTENING OF AN ASSEMBLY PART TO THE WELDABLE FASTENER

The present invention refers to a fastener which is welded by arc welding by one end face to a component and which is in the form of a radially resilient sleeve with a longitudinal slit and designed to permit resilient compression of the fastener, to a welding assembly apparatus for welding on elongate fasteners, with a feed channel and an axially displaceable holder for the fasteners, and to an arrangement for securing an assembly part on a fastener which has been welded by arc welding on to a component.

A fastener is known from the German Patent No. 832, 086, whereby this element is formed as clamping sleeve. While such a clamping sleeve could be welded in principle, since made of metal, the mentioned patent specification is silent in this respect, in the contrary the invention is directed on rounding off the ends of the sleeve. Therefore, this clamping sleeve is not appropriate for a permanent fixation and is not provided with retaining means for the fastening of assembly elements.

Furthermore fasteners are known from the Canadian Patent Specification No. 887,911, resp. British Patent Specification No. 1,275,799 in which a slotted sleeve is gripped in the interior of its central portion, by means of a bolt under resilient pressure, is pressed on to and welded to a component, whereupon the lateral portions are bent over. Such a method is not suitable for rationalised and above all for reliable production, as is required in the automotive industry.

The same applies to the element according to U.S. Pat. No. 3,996,446, which is in fact resilient in its design, but must firstly be taken into its single possible correct position in order to be gripped internally and pressed on during welding.

Further fasteners are known, such as are frequently used in the automotive industry, in order to fasten, for example, car body components or electrical cables or the like. A common factor in all these previously-known weld-on fasteners is that they are manufactured as solid studs, which as a rule have a flange by means of which they are welded to the sheet metal, for example according to German Patent Application No. 3,218,886 or German Utility Model No. 7,923,469. Such a solid stud requires a flexible collet on a stud welding equipment. It is apparent from the drawings of the German publication that the gripping with the collet of the stud welding equipment, due to the rigid design of the stud, and in particular also by the flange with wider diameter, requires the use of expensive mechanical parts, which must operate reliably even at high operating frequencies.

Moreover, problems arise due to the design of the previously-known studs relating to uniform weld quality of the fusion between the sheet metal part and the stud, for which special measures are necessary for the design of the welding surfaces of the stud. This applies also for the fasteners according to DE-B-2 227 384, in which either the threaded studs or the nuts must be welded on as fasteners. Both these illustrated fasteners cause high demands on the collet of the stud welding equipment, which must be specially designed for this purpose.

Moreover, when there is fatigue in the collet, electrical contact with the stud can no longer be guaranteed, which leads to scorched areas, reducing reliability, which is essential in assembly lines.

Finally, the previously known weld studs or fasteners have a defined welding surface, which must be accurately positioned in the welding equipment. This complicates the feeding, as these elements must be fed into the welding equipment pre-sorted.

Using this prior art as a starting point, one purpose of the present invention is to propose a weld-on fastener which on the one hand guarantees reliable welding onto a support and, even in its simplest embodiment, offers the possibility of fastening a variety of assembly parts thereon, while on the other hand simplifying the retaining portion of the welding equipment and its feeding system, ensuring an optimal flow of current between the collet and the fastener. This is a fastener wherein at least one of the two end faces is provided with an inward or outward edge directed to the other end face and standing out from the sleeve wall.

In a preferred embodiment of such a fastener it needs not be pre-sorted and accurately positioned in order to be fed into the rigid holder on the one hand, and on the other hand, the resilient force or push-on force is so high because of the formation of the longitudinal slit on the current-transferring holder, that an optimum transmission of current from the holder to the fastener is always ensured.

Whereas in one embodiment the conical funnels on both end faces of the fastener have a threaded shape, the fastener may also be provided with an external thread or with retaining claws. A common feature of all features is however that they are resilient in design, in order to ensure the flexibility necessary for the fastening technology, and guarantee good current conduct.

The previously-known studs for example are welded on with a welding equipment according to German Publication No. 3,218,886 or German Utility Model No. 7,925,469. Such a solid stud requires a flexible collet on the welding equipment. It is apparent from the drawings of the Disclosure Document that the holder with the collet of the welding equipment, constrained by the rigid execution of the stud and in particular also by the flange with its wider diameter, must comprise expensive mechanical parts, which must operate reliably even at high operating cycles.

In such welding equipments with known stud holders with a collet made from steel or beryllium copper, at the required flexibility the collet is subject to extreme wear, particularly when the contact and clamping surfaces of the collet bear against sharp thread zones of the stud.

In stud welding according to the drawn arc principle, 3–5000 A are transmitted through the small contact points, which, upon release of the clamping force of the collet, leads to scorched areas. This reduces the reliability, which is essential particularly in assembly lines.

Moreover, problems arise from the formation of the previously-known welding studs in terms of a uniform welding connection between the sheet metal part and the stud, so that special measures for shaping of the welding surfaces are necessary. This applies also to the fasteners according to DE-B-2 227 384, in which either threaded studs or nuts are welded on as fasteners. Both these illustrated fasteners make particularly stringent demands on the collet of the welding equipment, which for this purpose must be specially designed.

There is in addition known from European Patent Publication No. 0406 459 a stud welding gun requiring stud holder tubes with a differing diameters, as well as plastics washer inserts, whereby the retaining tubes being subject to relatively heavy wear.

Finally, the design of the previously-known weld studs with a defined welding surface requires an arrangement for accurately positioned feeding of the weld studs.

Starting from this point, a further purpose of the invention is to propose a welding equipment in which the feeding system and the retaining part for the fastener can be considerably simplified, and ensures an optimum current flow between the retaining part and the fastener during the welding process. This is a welding equipment wherein the axially displaceable holder, instead of being a collet chuck, is in the form of a rigid tube, in which the fastener in the form of a flexible sleeve is guided and surrounded over a wide surface area. In this way a large number of the movable parts of the welding equipment, which are liable to malfunction, are eliminated.

In known arrangements, the internal wall of the fastening bore of the assembly part which is to be assembled, mostly made from plastic material, usually has webs, which are uniformly distributed as stiff ribs. Assembling such a part on to a solid weldstud, which may be profiled, demands high push-on forces requiring high energy consumption and a stiff design, particularly with semi-automatic and automatic assembly tools.

Assembly parts are also known with locking protections which engage in a profiled portion on the weld stud; in this case, however, only little pull and shear forces are transmitted from the assembly point to the stud.

In the case also of a cylindrical bore in the assembly part, the assembly forces are higher by a multiple than in the assembly part with webs, yet here also contact is only established at points between the stud and the internal wall of the bore of the assembly part.

Starting from this point, a further purpose of the invention is to propose an arrangement for attaching an assembly part to a weld-on fastener which gives rise to considerable simplification of the mounting of the assembly parts, entailing greater reliability and safety of the connection, as well as offering a greater variety of attachment parts. This is an arrangement wherein the assembly part may be mounted in a frictionally- and positively-engaging manner on the fastener being in the form of a resilient sleeve, whereby at least the end face of the fastener which is not welded is provided with an inward or outward and to the other end face directed edge standing out from the sleeve wall and serving as retaining part.

The invention will be explained in more detail in the following with reference to a drawing illustrating embodiments given by way of example.

Figure 1:
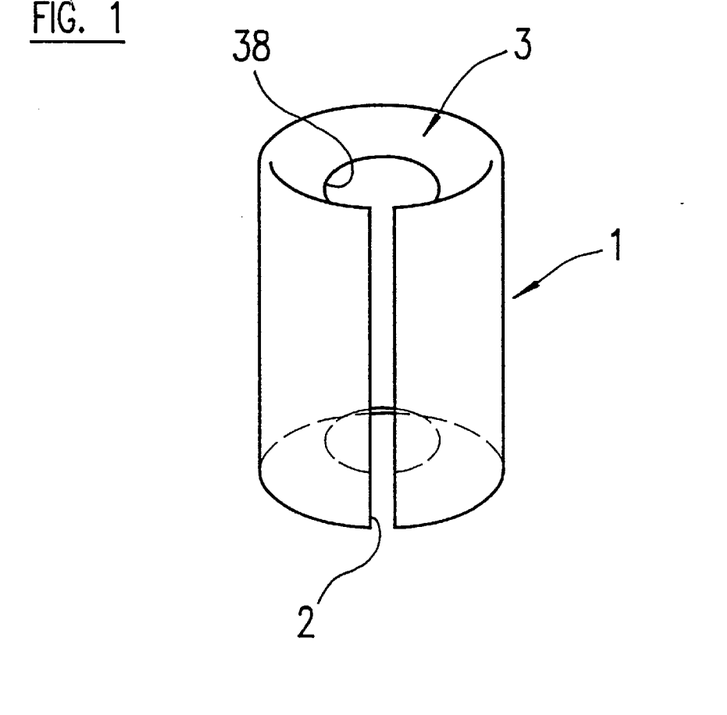
FIG. 1 shows in perspective view a first embodiment of a fastener according to the invention.
Figure 2:
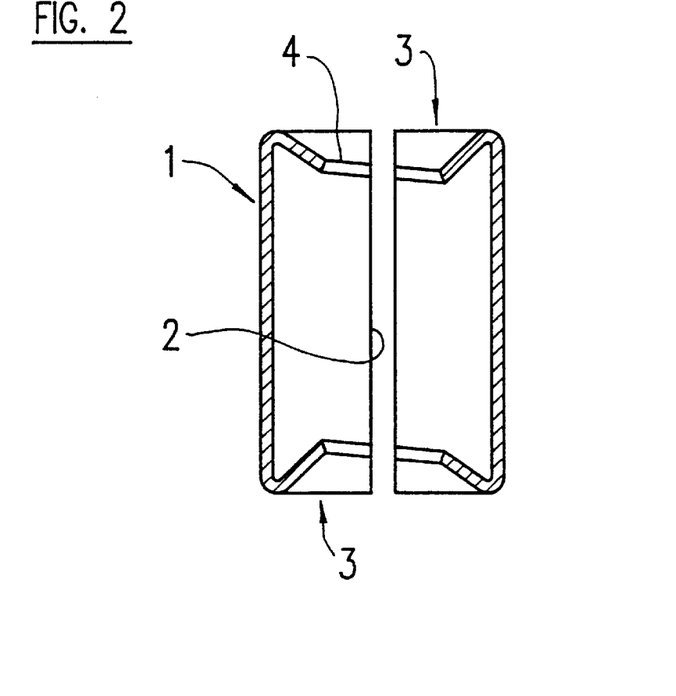
FIG. 2 shows the fastener of FIG. 1 in cross-section.

FIGS. 1 and 2 show a first fastener 1 in the form of a resilient sleeve and having a longitudinal slit 2. As FIG. 2 shows, this fastener is axially symmetrical in design with both end faces 3 in the shape a funnel to the internal side. The end faces however are not radially symmetrical, but so shaped that the internal edges 4 of the end faces have a thread-like profile. Due to the sleeve-shaped slit design of the fastener, it has, if appropriate materials are chosen, a high resilient force which involves a variety of advantages. The assembly parts attachable thereto have as a rule a large degree of dispersion of tolerances, so that the required flexibility by the use of rigid studs must alone be supplied by the plastics or metal components. This has the disadvantage that the forces transmitted through the assembly part are small. The forces which may be transmitted from a flexible fastener to an assembly part are thus considerably greater. Moreover, the weld studs made from solid material are of high weight, which in view of the number of weld studs which may be used in an automobile, comes to an overall weight which is not inconsiderable.

The necessity of welding the entire surface of a solid weld stud leads to a situation in which the large resultant welding surface stands in an unfavourable relationship to the thickness of the sheet metal. Because of this, thin sheet metal undergoes intense heating and heat transmission in the weld area, which leads to weakening of the strength in the edge area of the stud adjoining the sheet metal. These disadvantages are eliminated by the fastener according to FIGS. 1 and 2, as only annular welding zones and similar to identical material thicknesses are present.

As already stated, the symmetrical design of the fastener means that it need only be brought into the feed system in an axially directed manner, and requires no accurate positioning into the correct position. This simplifies the feeder equipment and increases its reliability.

Figure 3:
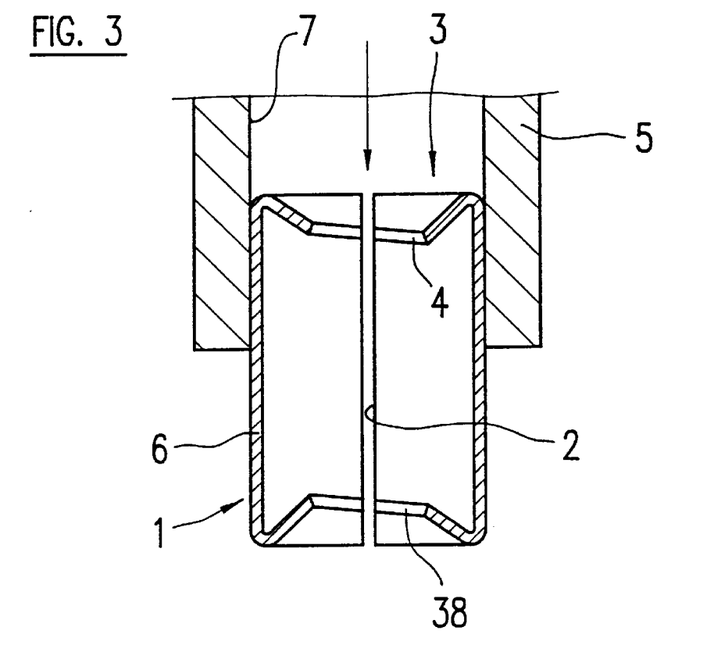
FIG. 3 shows a fastener according to FIG. 1 in a rigid holder of a welding equipment.

As stated, a further important advantage of the resilient sleeve-shaped fastener resides in the fact that the equipment can be substantially simplified. As the fastener is resilient in design, it is sufficient, instead of using a slitted collet with a complicated actuating mechanism, to use a rigid tube as a holder. This gives rise not only to substantial simplification of the welding equipment, but also to a considerable increase in its reliability. In FIG. 3, for example, the fastener 1 according to FIG. 1 is shown in a tube 5. The previously-known and conventional feed procedure for the fastener by means of flexible pipes and compressed air can be retained here, the fastener, as already stated, requiring only to be axially aligned. The welding process as such also remains the same, so that previously-known installations may be used, on which, instead of the complex holders with movable collets, a retaining tube can be used, which is axially displaceable. Naturally the compressed air pulse required to bring the fastener axially into its initial position in the feed tube 5, must be appropriately chosen in terms of size and length. The through opening 38 in the fastener permits a protective gas to be introduced to the point of welding. Both the outer surface 6 of the fastener and the internal surface 7 of the holder are smooth, in order to ensure the smoothest possible axial feeding, and a large-area surface contact for transmission of the welding current, both the material and the diameter of the bore in the fastener playing a part in the design and calculation of the external diameter of the fastener, and of the internal diameter of the tubular retaining means, in order to achieve a corresponding prestress.

Figure 4:
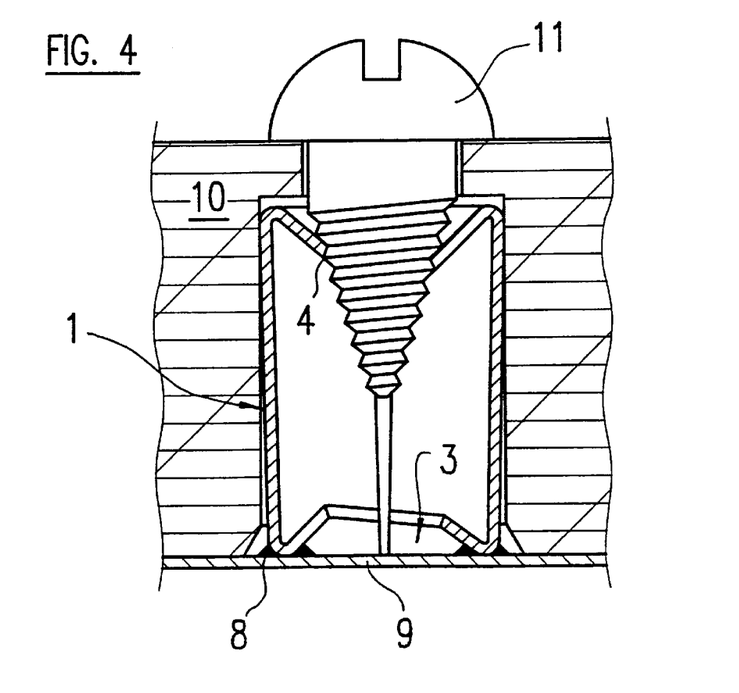
FIG. 4 shows a welded-on fastener according to FIG. 1 with a surrounding assembly part.

FIG. 4 shows the welded-on fastener 1 according to FIG. 1 with the surrounding assembly part 10. The fastener 1 is welded by the welding point 8 to a component 9, for example the sheet metal bodywork of an automobile. The assembly part 10, made for example of plastics material, is secured by a screw 11 which can be screwed directly into the thread 4 of the fastener 1. As the fastener is resilient in its upper zone even after being welded on, when the assembly part is pressed on a clamping action can be achieved in order to provide a secure connection after attachment by means of the screw.

Figure 5:
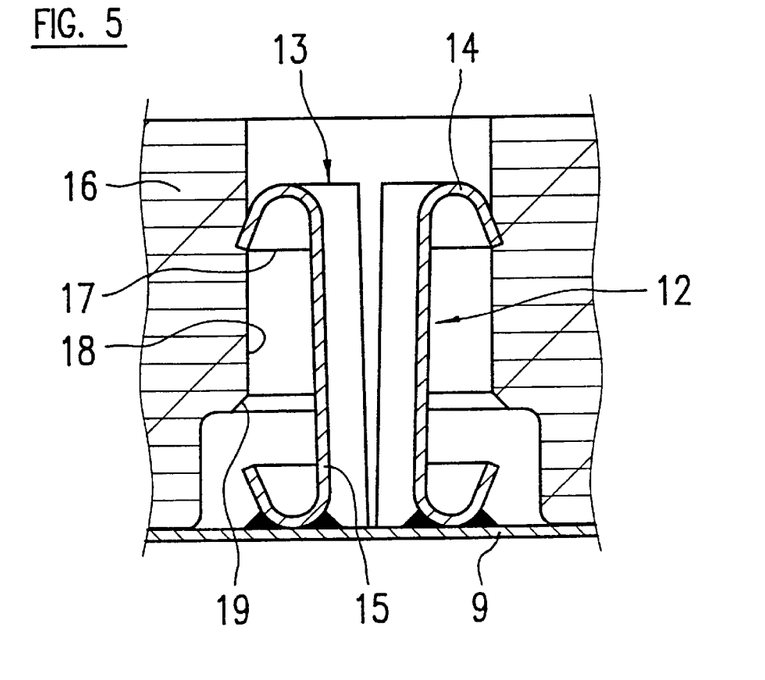
FIG. 5 shows a further welded-on fastener with an assembly part attached thereto.

FIG. 5 shows a further fastener 12, which is likewise resilient and sleeve-shaped in design and has a longitudinal slit, but in which the two end faces 13 have edges 14 which are bent outwards in a 'U' shape. These edges 14, which project out from the cylinder wall 15, can develop a clamping and retaining action. In this case this assembly member 16 appropriately has a bevelled area 19 in its bore 18, in order better to overcome the bent edge 14 of the fastener. Both external sides of the bent-over edge 14 must be such that they provide sufficient contact surface between the fastener and the holder.

Figure 6:
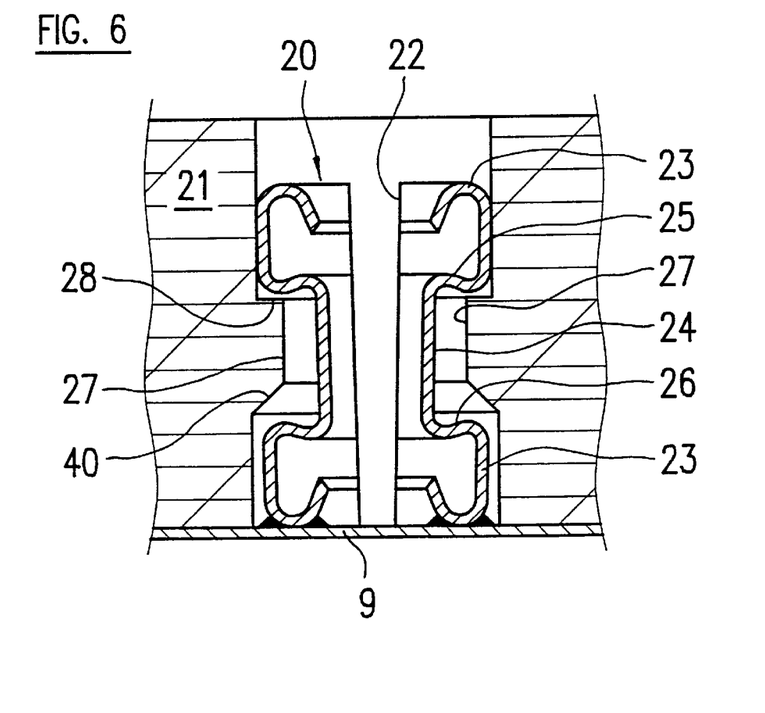
FIG. 6 shows a further welded-on fastener with an assembly part attached thereto.

FIG. 6 shows a further fastener 20, which because of its shape can retain an assembly part 21 by clamping action alone. The fastener 20 has the same end faces 3 and a longitudinal slit 22. The outer surface of the fastener is not even, but has two identical end portions 23 and a central portion 24, which is of smaller diameter than the end portions. This gives rise externally to two projections 25 and 26, one of which, projection 25, serves on the welded-on fastener to retain the assembly part. The assembly part 21 has a collar 27 corresponding to the constricted central portion 24 of the fastener, the upper edge 28 of which, in the drawing, engages behind the projection 25. For purposes of better introduction of the assembly member, the lower edge 40 is bevelled. It can be seen from the drawing that the bevelled edge and the collar compress the upper portion of the fastener upon its introduction, and this upper end portion then expands again in order to hold the assembly member securely.

Figure 7:
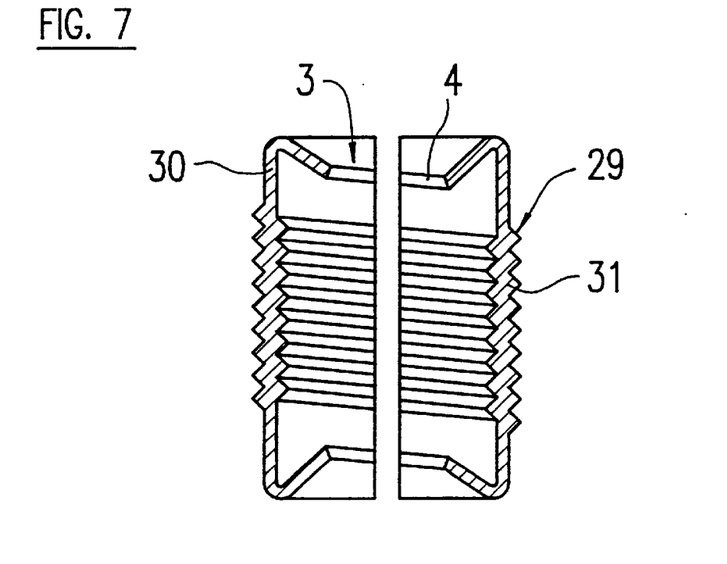
FIG. 7 shows in cross-section a further design variant of a fastener, with external thread.

The fastener 29 according to FIG. 7 has the same end faces 3 as the fastener according to FIG. 1, and also the upper terminal portions 30 are identical with those in that fastener. The central portion 31 however is in the shape of a screw-like thread. It should be noted that the fastener 29 according to FIG. 7 can accommodate either a screw internally and/or a screw or nut externally.

Figure 8:
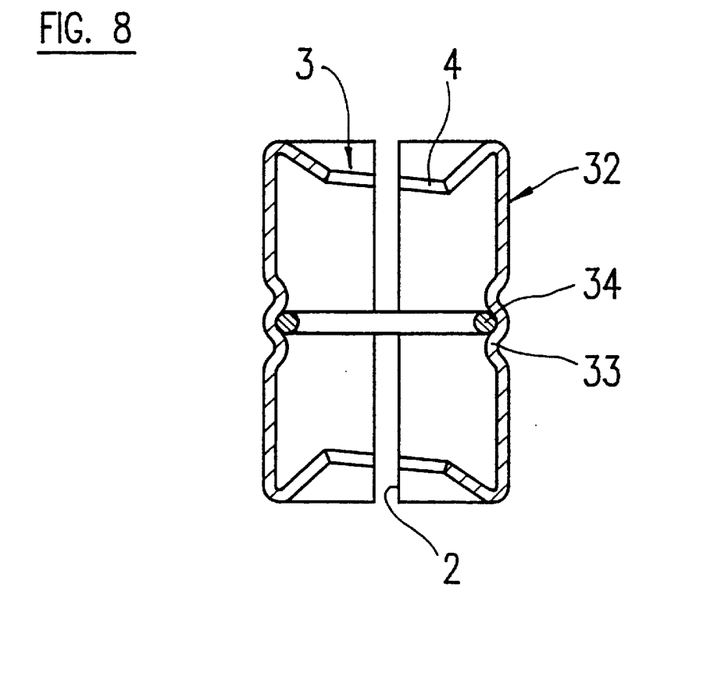
FIG. 8 shows in cross-section a further design variant of a fastener with spring-washer.

The fastener 32 according to FIG. 8 is identical in structure according to FIG. 1 with the exception of its central portion. The central portion 33 of the fastener 32 is S-shaped in order to receive internally a resilient clamp ring 34, the significance for fixing an assembly part being obvious.

Figure 9:
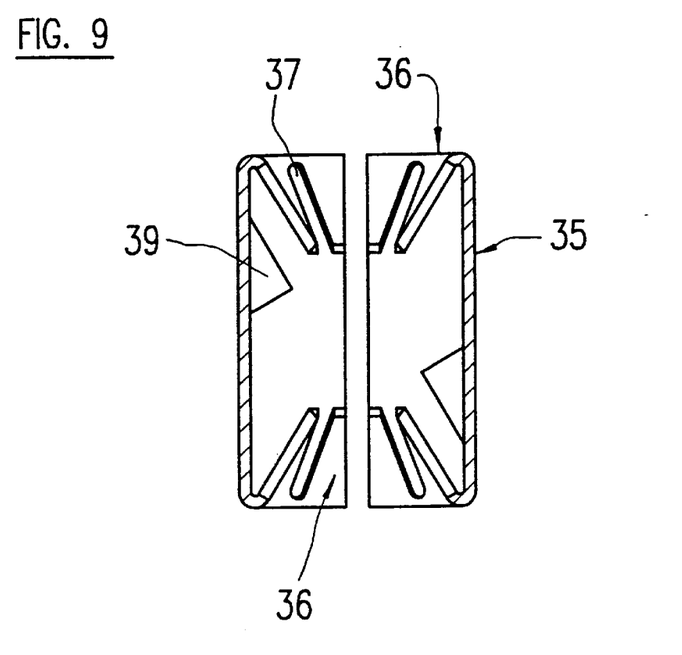
FIG. 9 shows a further embodiment of a fastener with internal retaining claws.

The fastener 35 in FIG. 9 is a further embodiment. Each end face 36 is provided with incisions, so that it is resilient. In this way not only can screws be received in the bore with a thread, but also studs or the like without a thread, which can be retained by the clamping action. This fastener likewise has a slit. In addition, retaining claws 39 are cut out axially from the surface of the fastener, and bent inwards. Depending on whether a stud is introduced from one side or the other into the fastener, one or the other claw 39 engages therein, additionally securing it.

Figure 10:
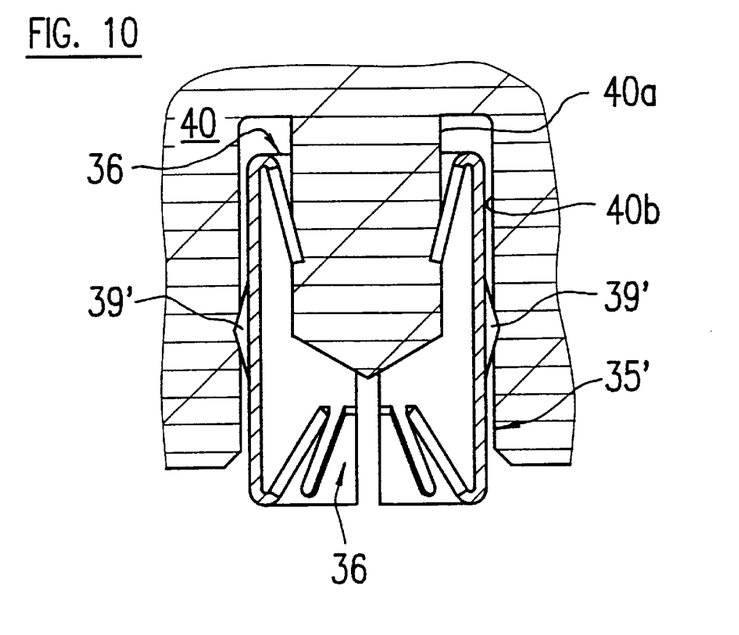
FIG. 10 shows a fastener with external retaining claws, with an assembly part attached thereon.

FIG. 10 shows a fastener 35' similar to that in FIG. 9, yet retaining claws 39' are bent outwards. When an assembly part 40 with a stud 40a is mounted, the claws 39' engage in the bore wall 40b of the fastener and additionally secure it.

Figure 11:
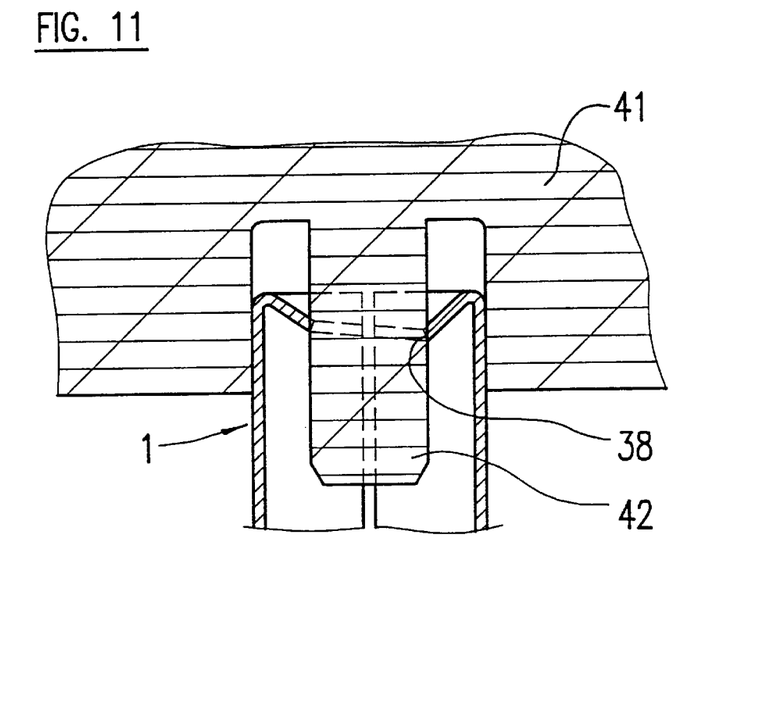
FIG. 11 shows a fastener according to FIG. 1 with an assembly part attached thereon.

FIG. 11 shows that, when an assembly part 41 is used with a stud 42 projecting into the bore 38 of the fastener 1, the retaining force of the bore wall is considerably increased by the fact that the fastener 1 is embraced by the assembly part.

Figure 12:
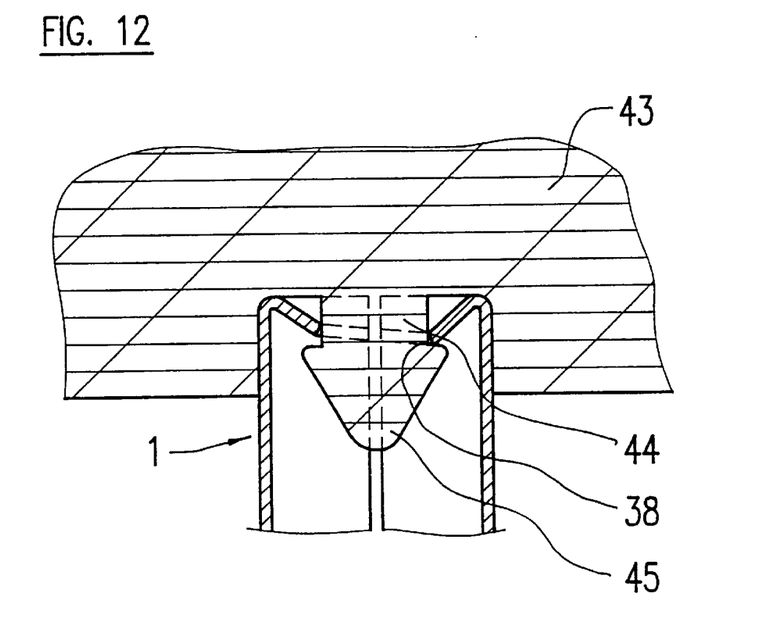
FIG. 12 shows a fastener according to FIG. 1 with an assembly part attached thereon.

FIG. 12 shows a further assembly part 43 with a stud 44 with a positively-engaging barb 45, which has a high retaining capability.

Figure 13:
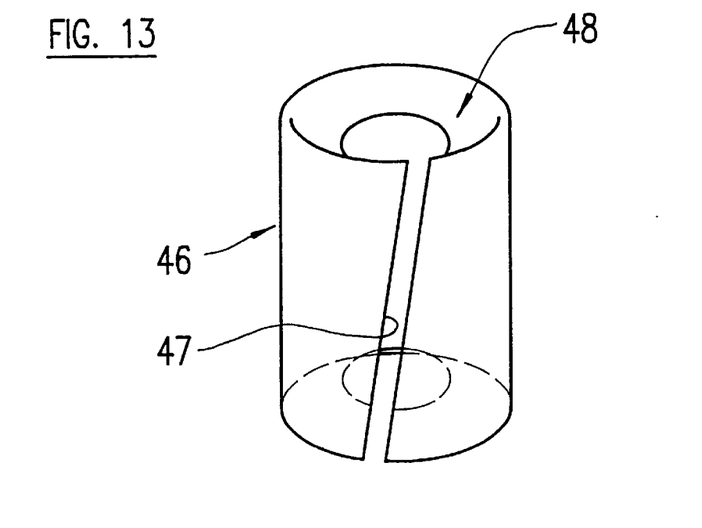
FIG. 13 shows a design variant of the fastener according to FIG. 1.

FIG. 13 shows that the term "longitudinal slit" does not necessarily mean a slit parallel to the longitudinal axis of the fastener. The fastener 46 has a longitudinal slit 47 which is inclined with respect to the longitudinal axis of the element. The other parts of the fastener with end faces 48 are identical with those in the fastener according to FIG. 2.

Figure 14:
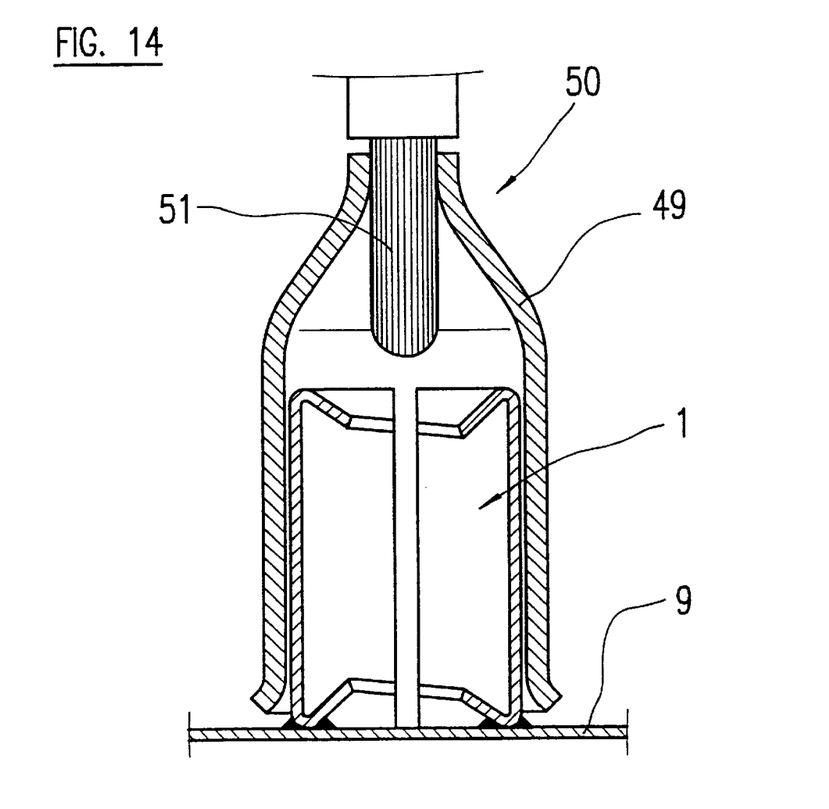
FIG. 14 shows an embodiment of an electrical connector with the fastener according to the invention.

FIG. 14 indicates the possibility of using a fastener according to the invention as an electrical connection; in principle, a fastener according to FIGS. 1 or 13 can be involved. The fastener 1 is welded on to a conductive base 9 and serves as a male plug portion, over which the female contact portion 49 of a correspondingly-shaped cable contact terminal 50 can be pushed, with the contact pin 51. By means of using a cylindrical or approximately cylindrical resilient fastener, automatic and effective connection is possible, which is impossible with flat plugs.

Figure 15:
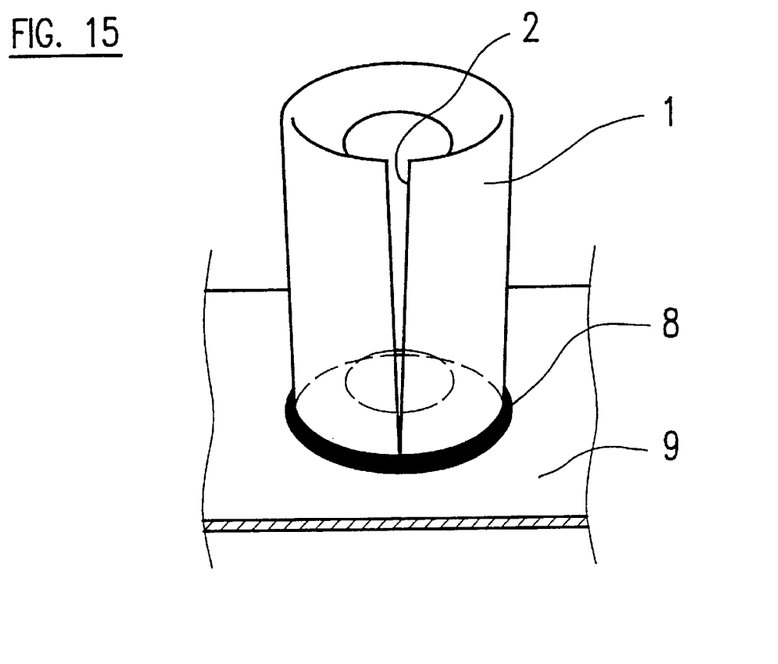
FIG. 15 shows an arrangement for measuring the welding quality.

It is possible, according to FIG. 15, to monitor the mechanical quality of the weld seam 8 on the base 9. As the fastener 1 has a slit 2, and it is welded on in a compressed state, the latter tends to expand again later. If the weld seam is not good, the width of the slit 2 will extend in a different way from that for a good weld seam. It is therefore possible, for example by optical inspection of the configuration of the slit, to come to a conclusion regarding the quality of the weld seam.

Figure 16:
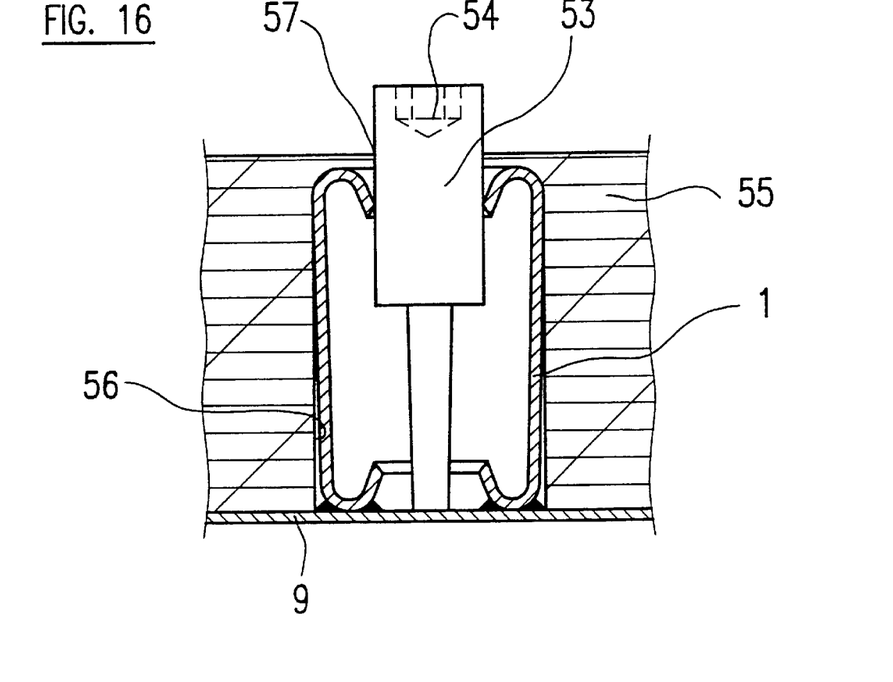
FIG. 16 shows a further type of attachment of an assembly part.
Figure 17:
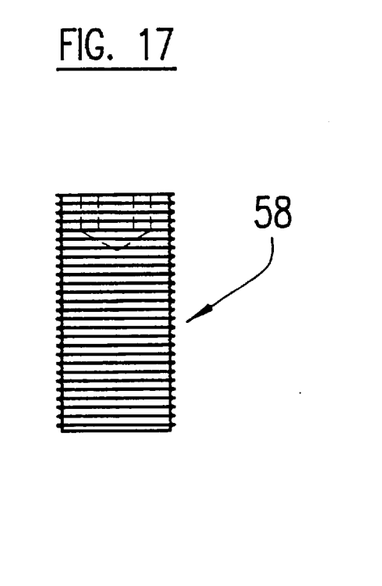
FIGS. 17 and 18 show two design variants of a part according to FIG. 16.
Figure 18:
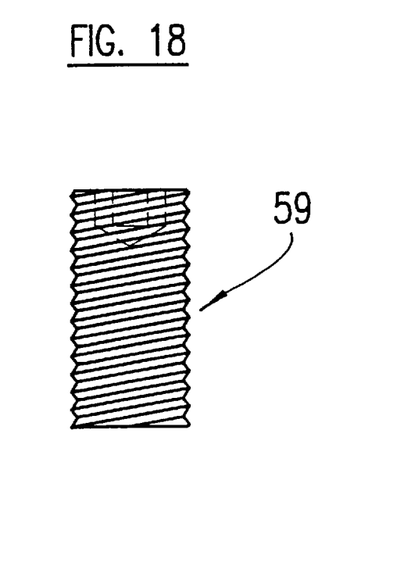

FIG. 16 shows a locking element in the shape of an expansion pin 53, which fits into the opening 38 of a fastener according to FIG. 1, and whose length is less than the smallest distance between the end faces 3 of the fastener. By pushing the pin into the interior of the fastener, the element can be unlocked. In order to provide better handling of the expansion pin, the latter has at least at one end a slit or internal hexagon 54 or the like. By means of this expansion pin, an assembly part 55 with blind hole 56 and smaller opening 57 for the expansion pin can be assembled, locked and unlocked. Instead of an expansion pin 53 with a smooth surface, a pin with a grooved or threaded surface can be used, in order to permit either better retention or turning in and out of the pin.

Figure 19:
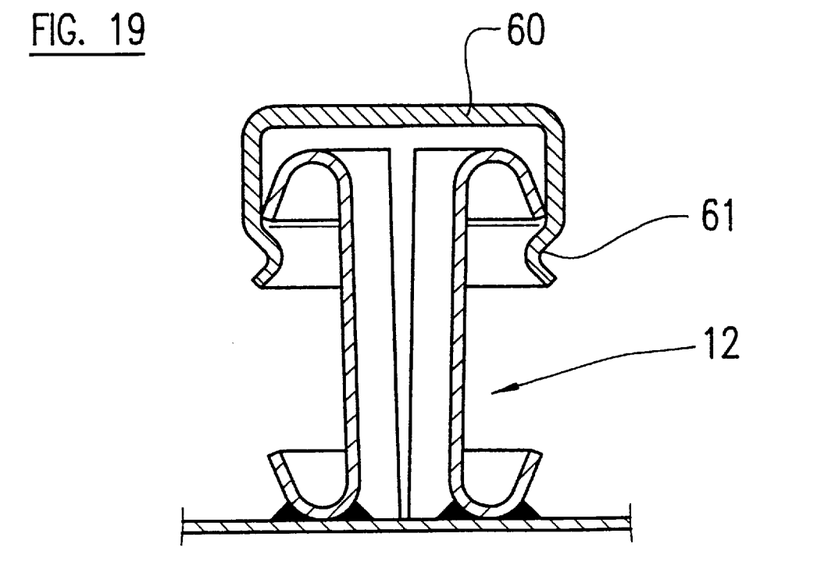
FIG. 19 shows a further assembly part.

FIG. 19 illustrates that the use of a resilient fastener opens the possibility of mounting a rigid component, e.g. a rigid cap 60 with an internal bead 62, on said fastener. The cap part can in itself represent an assembly part, or can be connected to such a part.

Figure 20:
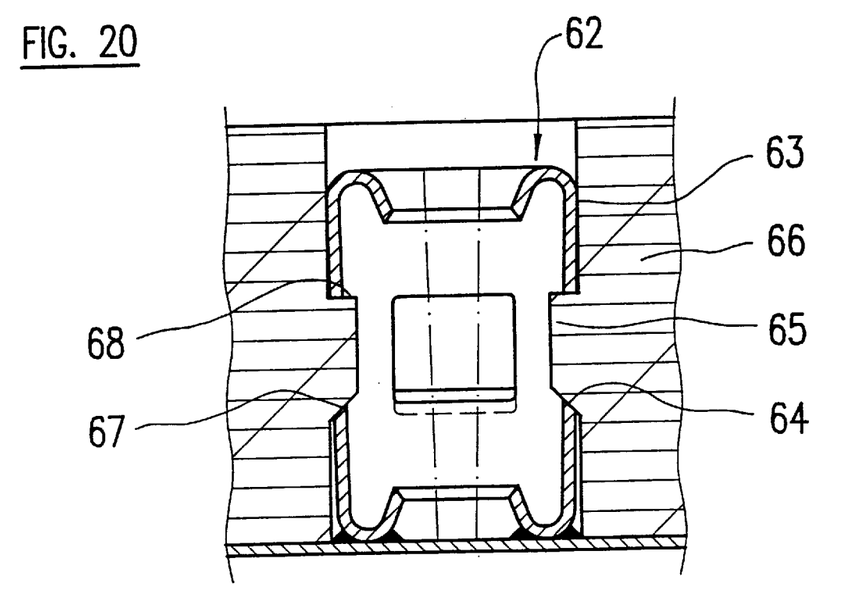
FIG. 20 shows a further design variant of a fastener and an associated assembly part.

FIG. 20 shows a further embodiment of a fastener. The fastener 62 has in its sleeve wall 63 a window 64, into which grip corresponding projections 65 on the assembly part 66, locking the latter. In order to improve the sliding in and locking, the projections have at their base, towards the support 9, bevels 67, and towards the top a projection 68. For unlocking, openings (not shown) may be provided in the assembly part, into which there fits a correspondingly shaped tool, in order to compress the fastener together.

Figure 21:
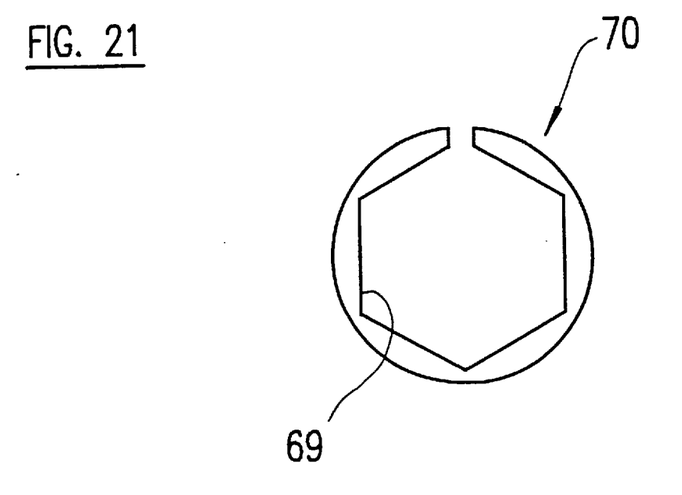
FIG. 21 shows a cross-section through another embodiment of a fastener.

FIG. 21 shows that the internal surface 69 of the sleeve wall of a fastener 70, instead of being cylindrical, can be polygonal, e.g. hexagonal, in order to prevent turning, whereas the external surface 71 at this point is cylindrical. With appropriate adaptation of the welding pistol it is feasible to make the external surface of the sleeve wall polygonal, e.g. hexagonal.

Whereas in the drawings the wall of the longitudinal wall of the fastener is shown as being of uniform thickness, portions thereof, particularly the central portion, can be of lesser thickness than the other portions.

A series of different fasteners have been indicated; these however have not been dealt with exhaustively. Thus from the examples, further possibilities may be combined, the essential features of the fastener, i.e. its design as a sleeve and the resilient property of the sleeve wall, however, appearing in all members. The automative industry was mentioned as an example of application, yet other fields of application are suitable for this device, in particular apparatus construction.

I claim:

1. A fastener that is weldable to a component, comprising:
   a radially resilient sleeve having opposite end faces, at least one of the end faces adapted to be welded at its edge to the component, the radially resilient sleeve being defined by a sleeve wall extending from one end face to the other and configured to be radially resiliently compressible along its entire length.

2. A fastener according to claim 1, wherein the radially resilient sleeve is hollow from one end face to the other.

3. A fastener according to claim 2, wherein the longitudinal slit is continuous and is inclined with respect to a longitudinal axis of the radially resilient sleeve.

4. A fastener according to claim 1, wherein the end faces are identical in construction in order to avoid previous sorting to ensure correct position in a welding assembly apparatus.

5. A fastener according to claim 1, wherein the end faces are hopper-shaped, narrowing towards an interior of the radially resilient sleeve, and are in the form of screw threads.

6. A fastener according to claim 1, wherein the sleeve wall of the fastener comprises two end portions, a narrower central portion, and projections extending from the narrower portion to each end portion, one of the projections serving as a retaining portion for an assembly part.

7. A fastener according to claim 6, wherein the central portion of the sleeve wall is in the form of a screw thread.

8. A fastener according to claim 6, wherein approximately the central portion of the sleeve wall is S-shaped, and a clamp ring is disposed in an interior of the radially resilient sleeve.

9. A fastener according to claim 6, wherein the sleeve wall has a lesser thickness at the central portion than at the end portions.

10. A fastener according to claim 1, wherein the sleeve wall has at least one of an internal claw and an external claw.

11. A fastener according to claim 1, wherein the radially resilient sleeve is tubular from one end face to the other.

12. A fastener according to claim 1, wherein the radially resilient sleeve has a longitudinal axis and is symmetrical about a plane perpendicular to the longitudinal axis.

13. A fastener according to claim 1, wherein the at least one of the end faces adapted to be welded to the component has an annular shape and is welded to the component by an annular weld seam.

14. A fastener according to claim 1, wherein the sleeve wall defines a longitudinal slit running from one end face to the other.

15. A fastener according to claim 14, wherein the radially resilient sleeve has a first end and a second end, and the radially resilient sleeve is hollow from the first end to the second end.

16. A fastener according to claim 14, wherein the component comprises sheet metal and the at least one of the end faces adapted to be welded to the component has a wall thickness similar to the thickness of the sheet metal.

17. A fastener according to claim 16, wherein the wall of the at least one of the end faces adapted to be welded to the component and the sheet metal have the same thickness.

18. A fastener according to claim 14, wherein at least one of the end faces has at least one of an inward edge and an outward edge extending away from the sleeve wall.

19. A fastener according to claim 18, wherein any inner edge of the end faces is slitted.

20. A fastener according to claim 18, wherein the radially resilient sleeve has a first end and a second end, and the radially resilient sleeve is hollow from the first end to the second end.

21. A fastener according to claim 1, wherein the end faces each have an edge bent outwardly in a 'U' shape, which serves as a retaining portion for assembly parts.

22. A fastener according to claim 14, wherein the longitudinal slit is continuous and extends parallel with a longitudinal axis of the fastener.

23. A fastener according to claim 1, wherein the sleeve wall has windows.

24. A fastener according to claim 1, wherein an external surface of the sleeve wall is cylindrical, and an internal surface of the sleeve wall is polygonal.

25. A fastener according to claim 24, wherein the internal surface of the sleeve wall is hexagonal.

26. A welded arrangement for securing an assembly part, comprising:
    a component to which the assembly part is to be secured; and
    a fastener welded to the component to engage and secure the assembly part, the fastener comprising a radially resilient sleeve having a sleeve wall, a free end, and a welded-on end that is welded to the component, the radially resilient sleeve being hollow from the free end to the welded-on end, the radially resilient sleeve configured to be radially resilient along its entire length where the assembly part may be mounted to the free end in a frictionally- and positively-engaging manner.

27. A welded arrangement according to claim 26, wherein the radially resilient sleeve has a longitudinal slit that extends from the free end to the welded-on end.

28. A welded arrangement according to claim 26, wherein the radially resilient sleeve has a longitudinal axis and is symmetrical about a plane perpendicular to the longitudinal axis.

29. A welded arrangement according to claim 26, wherein the component comprises sheet metal and the welded-on end has a wall thickness similar to the thickness of the sheet metal.

30. A fastener according to claim 29, wherein the wall of the welded-on end and the sheet metal have the same thickness.

31. A welded arrangement according to claim 26, wherein the welded-on end has an annular shape and is welded to the component by an annular weld seam.

32. A welded arrangement according to claim 26, wherein the component has an unbroken surface, and the welded-on end of the fastener is welded to the unbroken surface.

33. An arrangement according to claim 26, wherein an external surface of the sleeve wall of the fastener is cylindrical, and an internal surface of the sleeve wall is polygonal.

34. A welded arrangement according to claim 33, wherein the internal surface of the sleeve wall is hexagonal.

35. A welded arrangement according to claim 26, wherein the free end has at least one of an inward retaining portion and an outward retaining portion extending away from the sleeve wall.

36. A welded arrangement according to claim 35, wherein the fastener has an outward retaining portion that engages a bore in the assembly part.

37. A welded arrangement according to claim 35, wherein the fastener has an outward retaining portion, and the assembly part has a bore with a projection adapted to engage the outward retaining portion.

38. A welded arrangement according to claim 26, wherein the assembly part has at least one of a stud and a bore, and the fastener has claws adapted to engage the stud or the bore during mounting of the assembly part to the fastener.

39. A welded arrangement according to claim 26, wherein the fastener has a central bore, and the assembly part has a stud adapted to project into the central bore of the fastener and surrounds in a positively-engaging manner the fastener in order to increase the retaining force of the sleeve wall acting on the stud.

40. A welded arrangement according to claim 26, wherein the fastener has a central bore, and the assembly part has a stud with a positively-engaging barb adapted to project into the central bore.

41. A welded arrangement according to claim 26, wherein the assembly part is a cable contact terminal, a female contact portion adapted to surround the free end of the fastener.

42. A welded arrangement according to claim 26, and further comprising a spreader pin for insertion into a central bore of the fastener, wherein the assembly part has a blind hole for receiving the fastener and a concentric, smaller opening for receiving the spreader pin, the spreader pin having a length which is less than the smallest distance between ends of the fastener.

43. A welded arrangement according to claim 42, wherein the spreader pin has at least one of a slitted end and an end with an internal hexagon, and the spreader pin also has an outer surface that is at least one of smooth, grooved, or in the form of a thread.

44. A welded arrangement according to claim 26, wherein the assembly part comprises a rigid cap with an internal bead that can be mounted on the fastener and with edges bent outwards in a 'U' shape.

45. An arrangement according to claim 26, wherein the assembly part has a bore with projections projecting into the bore, the projections being engageable with a snap action in correspondingly-shaped windows in the sleeve wall of the fastener.

46. An arrangement according to claim 45, wherein the projections have, towards a base of the assembly part, bevels and, towards a top of the assembly part, a projection.

47. A fastener that is weldable to a component of sheet metal, comprising:
a radially resilient sleeve having opposite end faces, at least one of the end faces adapted to be welded at its edge to the component and having a wall thickness similar to the thickness of the sheet metal component, the radially resilient sleeve being defined by a sleeve wall extending from one end face to the other and configured to be radially resiliently compressible along its entire length.

48. A fastener according to claim 47, wherein the wall of the at least one of the end faces adapted to be welded to the component and the sheet metal have the same thickness.

49. A fastener according to claim 47, wherein the end faces are identical in construction in order to avoid previous sorting to ensure correct position in a welding assembly apparatus.

50. A fastener according to claim 47, wherein the end faces are hopper-shaped, narrowing towards an interior of the radially resilient sleeve, and are in the form of screw threads.

51. A fastener according to claim 47, wherein the sleeve wall comprises two end portions, a narrower central portion, and projections extending from the narrower portion to each end portion, one of the projections serving as a retaining portion for an assembly part.

52. A fastener according to claim 51, wherein the central portion of the sleeve wall is in the form of a screw thread.

53. A fastener according to claim 51, wherein approximately the central portion of the sleeve wall is S-shaped, and a clamp ring is disposed in an interior of the radially resilient sleeve.

54. A fastener according to claim 51, wherein the sleeve wall has a lesser thickness at the central portion than at the end portions.

55. A fastener according to claim 47, wherein the sleeve wall has at least one of an internal claw and an external claw.

56. A fastener according to claim 47, wherein the sleeve wall has windows.

57. A fastener according to claim 47, wherein an external surface of the sleeve wall is cylindrical, and an internal surface of the sleeve wall is polygonal.

58. A fastener according to claim 57, wherein the internal surface of the sleeve wall is hexagonal.

59. A fastener according to claim 47, wherein the radially resilient sleeve has a longitudinal axis and is symmetrical about a plane perpendicular to the longitudinal axis.

60. A fastener according to claim 47, wherein the at least one of the end faces adapted to be welded to the component has an annular shape and is welded to the component by an annular weld seam.

61. A fastener for welding to a component comprising:
a hollow sleeve having a first open end, a second open end, and a slit extending along an entire length of the hollow sleeve, the first open end adapted to be welded at its edge to the component and the second open end adapted to engage an assembly part to secure the assembly part to the component.

62. A fastener according to claim 61, wherein said hollow sleeve is radially resiliently compressible along its entire length.

63. A fastener according to claim 61, wherein the first open end and the second open end are identical in construction in order to avoid previous sorting to ensure correct position in a welding assembly apparatus.

64. A fastener according to claim 61, wherein the first open end and the second open end are hopper-shaped, narrowing towards an interior of the hollow sleeve, and are in the form of screw threads.

65. A fastener according to claim 61, wherein the hollow sleeve has two end portions, a narrower central portion, and projections extending from the narrower portion to each end portion, one of the projections serving as a retaining portion for an assembly part.

66. A fastener according to claim 65, wherein the central portion of the hollow sleeve is in the form of a screw thread.

67. A fastener according to claim 65, wherein approximately the central portion of the hollow sleeve is S-shaped, and a clamp ring is disposed in an interior of the hollow sleeve.

68. A fastener according to claim 65, wherein the hollow sleeve has a lesser thickness at the central portion than at the end portions.

69. A fastener according to claim 61, wherein the hollow sleeve has at least one of an internal claw and an external claw.

70. A fastener according to claim 61, wherein the hollow sleeve has windows.

71. A fastener according to claim 61, wherein an external surface of the hollow sleeve is cylindrical, and an internal surface of the hollow sleeve is polygonal.

72. A fastener according to claim 71, wherein the internal surface of the hollow sleeve is hexagonal.

73. A fastener according to claim 61, wherein the hollow sleeve has a longitudinal axis and is symmetrical about a plane perpendicular to the longitudinal axis.

74. A fastener according to claim 61, wherein the component comprises sheet metal and the first open end has a wall thickness similar to the thickness of the sheet metal.

75. A fastener according to claim 74, wherein the wall of the first open end and the sheet metal have the same thickness.

76. A fastener according to claim 61, wherein the first open end has an annular shape and is welded to the component by an annular weld seam.

\* \* \* \* \*